United States Patent

Huber et al.

[11] 3,792,911
[45] Feb. 19, 1974

[54] RADIAL ROLLING BEARING

[75] Inventors: Wolfgang Huber, Schweinfurt; Anton Marx, Sulzthal, both of Germany

[73] Assignee: SKF Industrial Trading and Development Company N.V., Amsterdam, Netherlands

[22] Filed: Feb. 25, 1972

[21] Appl. No.: 229,418

[30] Foreign Application Priority Data
Mar. 3, 1971 Germany.............................. 7107931

[52] U.S. Cl. ................................................ 308/35
[51] Int. Cl. ........................................... F16c 21/00
[58] Field of Search................................. 308/35, 9

[56] References Cited
UNITED STATES PATENTS
3,063,041  11/1962  Quade et al. ........................ 308/001
3,494,674  2/1970  Muijderman et al. .................. 308/9

FOREIGN PATENTS OR APPLICATIONS
1,464,889  11/1966  France................................. 308/35

OTHER PUBLICATIONS
New Departure Publication, General Motor, Bristol, Conn. Mar., 1963.

Primary Examiner—Manuel A. Antonakas
Assistant Examiner—Frank Susko
Attorney, Agent, or Firm—Murray Schaffer

[57] ABSTRACT

A radial rolling bearing in which one of the portions carrying a race surface, for example, one of the race rings is provided with a rim member having a frontal face lying in a plane at right angles to the central axis of the bearing and having formed thereon spiral grooves.

6 Claims, 6 Drawing Figures

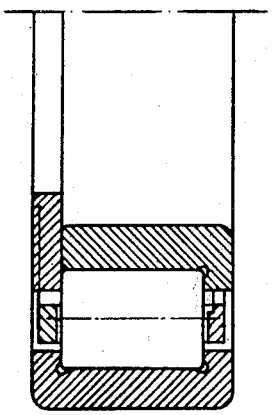
Fig. 5
Fig. 6
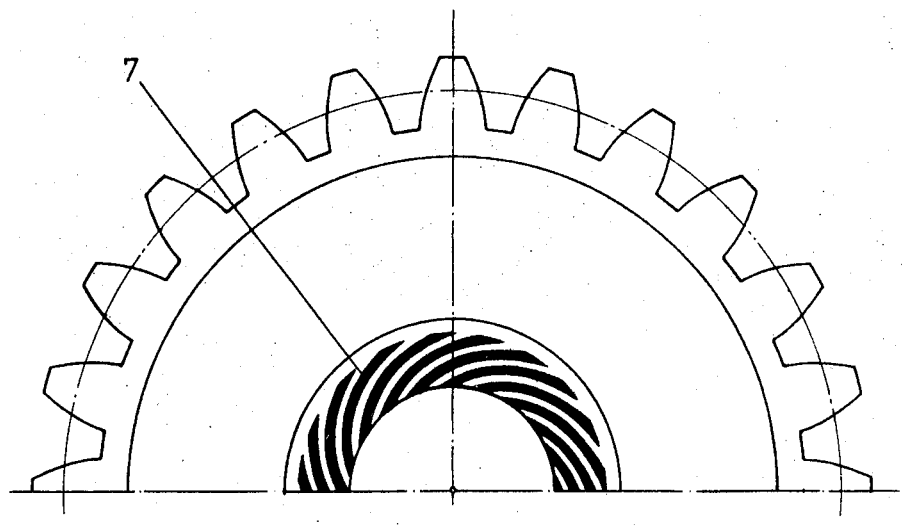

RADIAL ROLLING BEARING

BACKGROUND OF INVENTION

The present invention relates to the construction of radial rolling bearings, and particularly to radial rolling bearings capable of absorbing axial thrust in addition to the radial load.

Radial roller bearings capable of absorbing axial thrust supplemental to the radial load are known. One such type of bearing is disclosed in German Gebrauchsmuster Publication 1,990,107. In this device there is supported on one side of the outer ring, a radially directed flange on which a slip or sliding-impact plate is fastened. The plate bears against a shoulder formed in the supporting shaft, journal or housing, and can thus receive and absorb the axial thrust. This sliding-impact plate is capable only of absorbing axial stresses in a limited site (amount). Although there is built between the sliding-impact plate and its opposing face, under only extremely favorable conditions, a film of oil or lubricant, the impact plate is not provided with any constructive means to insure the establishment of a proper build up of pressure in the film and consequently a proper barrier for the absorbtion of the axial stresses is not continuously maintained. This has a long term disadvantage on the operation of the bearing resulting in increased operating and maintenance costs.

An object of the present invention is the provision of a radial rolling bearing capable of absorbing axial stresses of a large size (amount) and one that provides an effective continuous pressure barrier. It is also the object of the present invention to provide such an axial bearing made of fewer parts than the conventional bearings and which is simpler and less expensive to make and to use.

SUMMARY OF INVENTION

The objects of this invention are obtained in a radial rolling bearing in which one of the portions carrying a race surface, for example, one of the race rings is provided with a rim member having a frontal face lying in a plane at right angles to the central axis of the bearing and having formed thereon spiral grooves.

Such a construction permits the use of a lubricating oil having a relatively low viscosity and enables higher operating and rotating speeds. Such a bearing also has a greater degree of radial and axial stress absorption. This results from a build up of a pressure barrier in the lubricant, by the relative movement of the bearing's frontal face and the opposing face of the bearing housing, journal, or the face of the support. As a result, a sufficient separation between the opposing faces and the continuous sufficient and functioning load capacity is thereby created.

Bearings, in accordance with the present invention, are inexpensive to make and to install. Auxiliary spacer elements are not required to take up the axial forces. As an additional feature of the present invention, the spiral grooves can be made on a fixed rim or on a separable or removable rim. They can be formed on the inside of the frontal face of a needle bearing bushing. In accordance with this invention virtually any bearing can be adapted to obtain the pressure barrier. Any one of the known frontal faces of the bearing can be provided with the spiral grooves for the benefits enumerated.

BRIEF DESCRIPTION OF DRAWINGS

Full details of the present invention are set forth in the following description and in the accompanying drawings, wherein:

FIG. 5 is a sectional view through another roller bearing with a removable rim, FIG. 6 is a frontal view of a gear provided with spiral grooves

DESCRIPTION OF INVENTION

Figure 1:
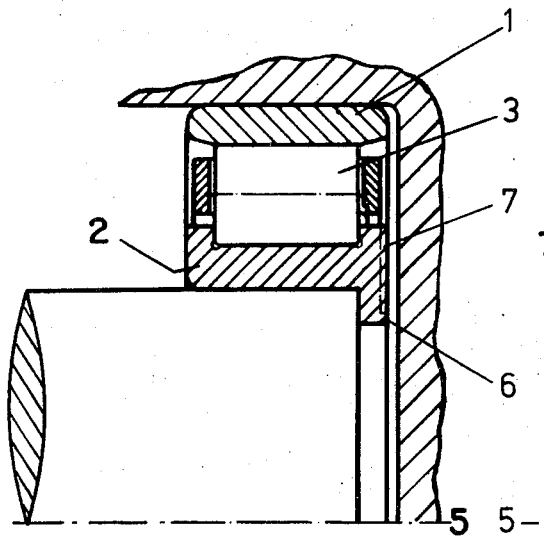
FIG. 1 is a sectional view through a cylindrical roller bearing showing the present invention.
Figure 2:
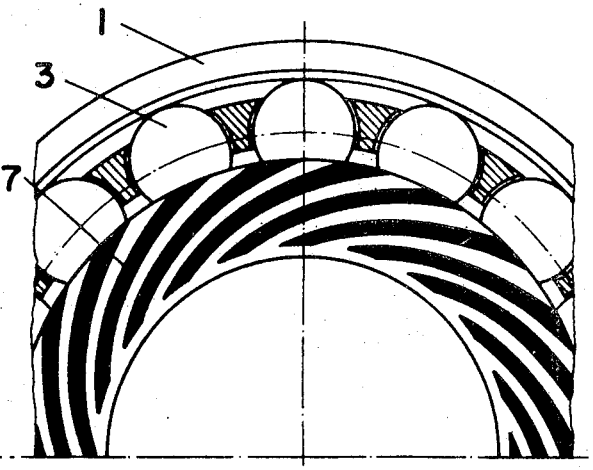
FIG. 2 is a frontal view of the bearing shown in FIG. 1.

In FIG. 1 and 2 the depicted bearing is formed of an outer race ring 1 and an inner race ring 2, between which a plurality of cylindrical rollers 3 are arranged. The inner race ring 2 is formed, at one of its axial ends, with an integral unitary retaining rim member 6 lying in a plane at right angles to the bearing axis or axis of rotation 5. The rim has a radial inwardly extending portion on the outer frontal face of which there are embossed, etched, cut or otherwise formed, spiral grooves 7. The grooves 7 may be in the form of a logarithmic, or an Archimedes spiral or in the form of any type of curves which create a pressurized barrier.

As conventional such bearings may be provided with lubricant between the opposed frontal faces, sealed within the housing. Such lubricants may be oil or grease. The bearing may be left dry and with an air barrier, if desired.

The bearing, as a whole, is otherwise convention in structure and operation and further details need not be set forth herein. The bearing is installed on or about a shaft or other rotating elements in the known manner with the frontal portion of the rim 6 axially adjacent an opposing face of a shaft support element, a journal or a housing, or the like. The bearing reacts simultaneously to the radial forces and the axial forces so that a relative movement occurs between the frontal faces of the rim 6, carrying the grooves 7, and the opposing face of the shaft, support or journal element (not shown). This relative movement creates a pressure in the lubricant located between the opposed faces which creates a pressurized barrier maintaining the opposing faces in proper axial relation. The grooves contain the lubricant in a defined rotational path and the pressure is automatically created.

Figure 3:
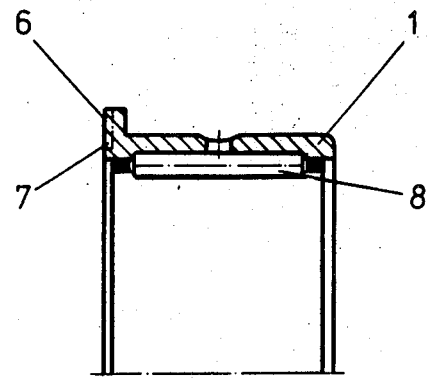
FIG. 3 is a view through a needle bearing.

FIG. 3 depicts a needle roller bearing comprising an outer race ring 1 in which a plurality of needles 8 are arranged in a ring or crown. The outer race ring 1 has, at one of its axial ends, a radially outward extending rim 6 on which spiral grooves 7, similar to that of FIG. 1, are formed. The construction of the needle bearing is otherwise conventional and will function in the well known manner. The grooves 7, however, will provide the desired axial pressure barrier between the face of the rim 6 and the face of the housing or journal element in the manner described in connection with FIG. 1 and 2.

Figure 4:
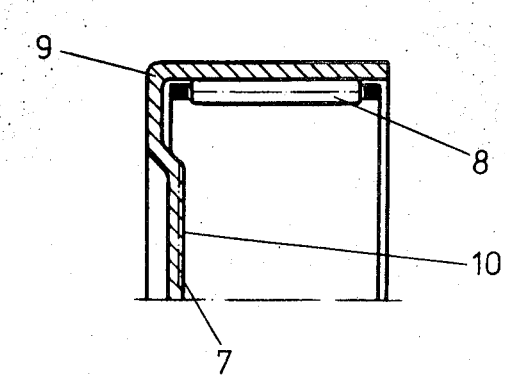
FIG. 4 is yet another view through a needle bushing.

FIG. 4 shows another embodiment of the present invention in the form of a needle bushing for receiving the end of a shaft, for example. The needle bushing comprises a ring or crown of needles 8 set into a metal sheet shaped in the form of a cup. The interior surface portion of the bushing 9 forming the axial bearing surface 10 is provided with spiral grooves 7 of the type previously described so that here too the relative movement between this surface and the opposing surface of the shaft or journal located within the bushing will create a pressure barrier by which the axial forces will be absorbed.

The present invention results in the ability to do without and to omit the use of, elements heretofore used to insure the proper axial spacing of the bearing and its supporting structure. The fitting of disks, washers or other elements to limit the axial compression, between the bearing and the support, is not required, since the spiral grooves create and continuously insure an automatic self-adjustment between the respective elements. In operation, the device generates an equilibrium of forces between the external axial stresses and the pressures produced in the bearing itself. This equilibrium of stress maintains the bearing under optimum operating condition throughout use. The depth of the grooves need not be great to effect the pressure barrier and preferably it is shallow. However, since speed, lubricant and other factors are at play, the exact depth may be determined by experience.

It is evident that the present invention is not limited to the form shown, nor is it limited to use only on the specific bearings depicted. It is also possible to create the grooves on separable or removable rims as shown in FIG. 5, or on rims which are not unitarily formed with the race ring but which are later secured thereto by clips or other means. Furthermore, in this vein, the grooves may be formed on separable disks or washers or the like, as well as on the gears (see for example FIG. 6) or faces of the coupling element used in connection with support for the bearing so that in any one of these manners, the axial stress can be easily absorbed. In this way either one or both of the two opposing frontal faces in a system formed by a bearing and a bearing support can be formed with the spiral grooves.

We claim:

1. Apparatus for the axial and radial journalling of an axle with respect to a housing support comprising a radially extending surface formed on at least one of the axle or housing support perpendicular to the axis of rotation, and a rolling bearing comprising at least one race member, and a plurality of elongated rollers, said one race member having a portion engaging one of the axle or housing support and a portion forming a frontal face lying in a plane perpendicular to the bearing axis in opposition to said extending surface and spiral grooves formed on at least one of said frontal face and said extending surface enabling the creation of an axial pressure barrier between the frontal face of said race member and said extending surface exterior of the rolling bearing.

2. Apparatus according to claim 1 wherein the portion forming the frontal face comprises a rim for axially retaining said rollers said rim being integral to said race member.

3. Apparatus according to claim 1 wherein the portion forming the frontal face is separable from said race member.

4. Apparatus formed in accordance with claim 1 wherein the spiral groove are formed on the interior surface of said portion forming the frontal face.

5. The assembly of a radial bearing having inner and outer race rings respectively engaging an axle and a support, said race rings and said support each having a frontal opposing face portion lying at right angles to the bearing axis, at least one of said frontal faces being formed with grooves, said grooves being adapted to provide a pressure barrier between the support and the bearing to simultaneously absorb axial forces exerted exteriorly of said bearing.

6. The assembly according to claim 5 wherein said grooves are spiral.

* * * * *